(12) United States Patent
Arquero et al.

(10) Patent No.: US 10,764,031 B2
(45) Date of Patent: Sep. 1, 2020

(54) BLOCKCHAIN SYSTEM FOR PATTERN RECOGNITION

(71) Applicant: International Business Machines Corporation, Armonk, NY (US)

(72) Inventors: Gregg Arquero, White Plains, NY (US); Steven Burchfield, Woodstock, NY (US); Syed F. Hossain, Wappinger Falls, NY (US); Joshua Schaeffer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 15/834,958

(22) Filed: Dec. 7, 2017

(65) Prior Publication Data
US 2019/0182028 A1 Jun. 13, 2019

(51) Int. Cl.
*H04L 9/06* (2006.01)
*H04L 9/32* (2006.01)
*G06K 9/62* (2006.01)
*H04L 29/08* (2006.01)
*H04L 29/06* (2006.01)

(52) U.S. Cl.
CPC .......... *H04L 9/0637* (2013.01); *G06K 9/6227* (2013.01); *H04L 9/3239* (2013.01); *H04L 9/3247* (2013.01); *H04L 9/3297* (2013.01); *H04L 63/14* (2013.01); *H04L 67/22* (2013.01); *H04L 2209/38* (2013.01)

(58) Field of Classification Search
CPC ... H04L 9/0637; H04L 9/3247; H04L 9/3239; H04L 9/3297; H04L 67/22; H04L 63/14; H04L 2209/38; G06K 9/6227
See application file for complete search history.

(56) References Cited

U.S. PATENT DOCUMENTS

| 9,553,982 B2 | 1/2017 | Unitt |
| 9,569,771 B2 | 2/2017 | Lesavich et al. |
| 2014/0330784 A1* | 11/2014 | Sundaram ............... H04L 29/06 707/639 |
| 2019/0014124 A1* | 1/2019 | Reddy ................... H04L 9/3236 |

(Continued)

OTHER PUBLICATIONS

Yang, Y. et al.; Mechanisms for Validating Authorization/Delegation Hierarchy Using Blockchain Technology, IP.com No. IPCOM000248695D, IP.com Electronic Publication Date: Dec. 27, 2016.

(Continued)

*Primary Examiner* — Nelson S. Giddins

(57) ABSTRACT

An example operation may include one or more of a network interface configured to receive requests transmitted from client devices, each request comprising a plurality of data attributes, a processor configured to detect a pattern from within the received requests, the detected pattern comprising a plurality of requests that share one or more data attributes in common and a storage configured to store the detected pattern as a hash-linked chain of blocks within a blockchain, wherein the hash-linked chain of blocks comprises a sequence of blocks corresponding to a sequence of the plurality of requests included in the detected pattern, and, after the first block, each subsequent block in the hash-linked chain of blocks includes a hash of request data that is stored in a previous block.

20 Claims, 6 Drawing Sheets

(56) References Cited

U.S. PATENT DOCUMENTS

2019/0116142 A1* 4/2019 Chalakudi ............... H04L 67/20
2019/0122258 A1* 4/2019 Bramberger ......... G06N 3/0445
2019/0182284 A1* 6/2019 Signorini ................ G06F 21/55
2019/0340588 A1* 11/2019 Haldenby .............. G06Q 50/18

OTHER PUBLICATIONS

Anonymously; IP.com No. IPCOM000204597D, IP.com Electronic Publication Date: Mar. 5, 2011.

EY Global Insurance; Blockchain technology as a platform for digitization, Mar. 2016.

\* cited by examiner

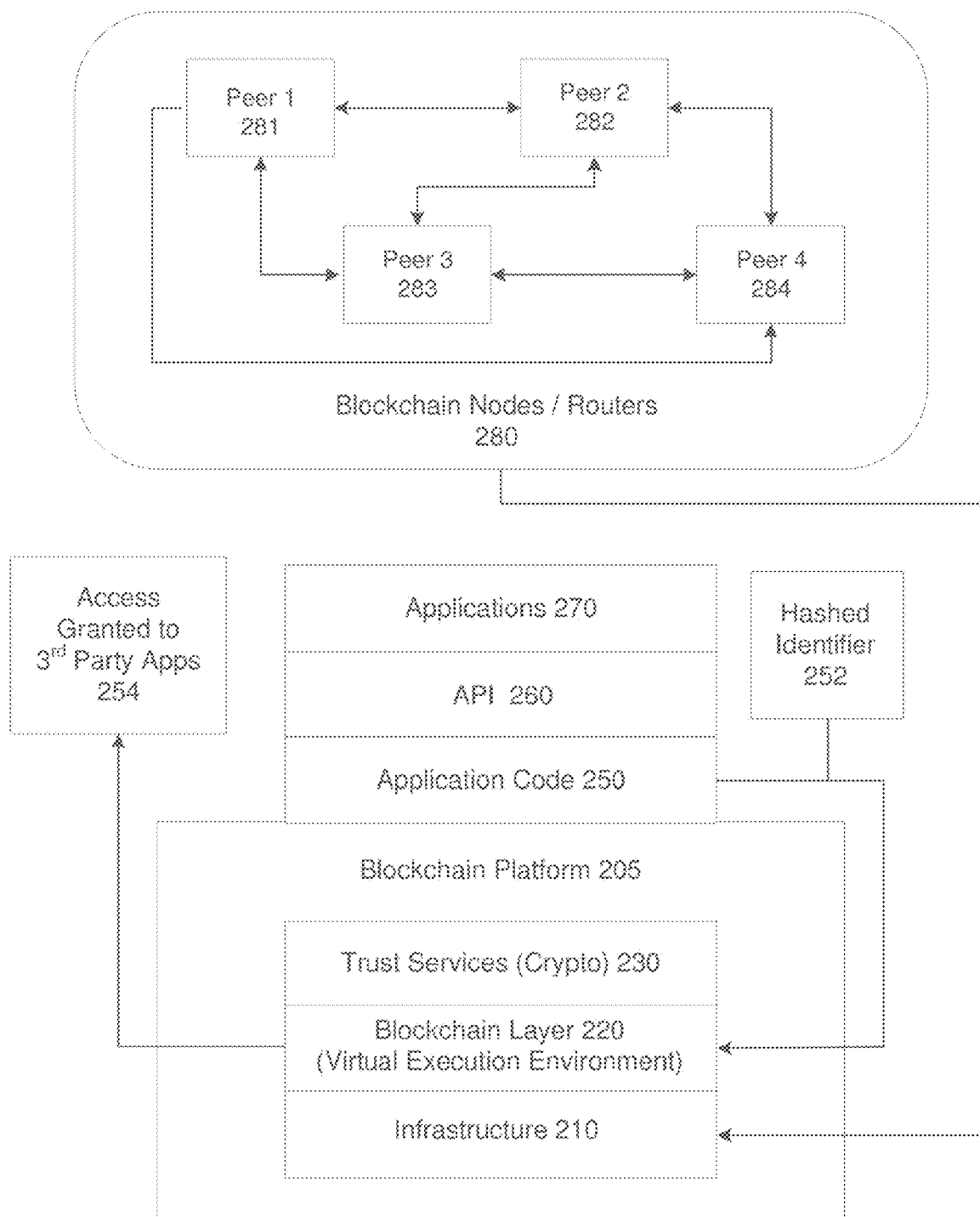

BLOCKCHAIN SYSTEM FOR PATTERN RECOGNITION

TECHNICAL FIELD

This application generally relates to a blockchain system and more particularly, to a blockchain system for pattern recognition.

BACKGROUND

A blockchain may be used as a public ledger to store information such as digital assets including currency, goods, services, and the like. Because any individual or entity can often provide information to a blockchain, this information should be reviewed and confirmed. However, a blockchain does not typically have a centralized authority but instead relies on a decentralized consensus which transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

Meanwhile, network routing is a process of transmitting and routing requests over a network between two or more nodes. In some cases, network routing may incorporate packet routing techniques and processes on external networks or those that are hosted or Internet enabled. Routers can utilize IP-based networks such as those which are publicly accessible such as that of ISPs. Internet routing enables a user to access web pages and other data stored on a remote website. Internet routing involves broadcasting or sending a message from an internal network to an external network using Internet-based networks. Such routing generally involves sending a message that travels between several routers such as Internet service providers (ISP) and autonomous systems (AS) before reaching its destination. However, given the publicly accessible nature of Internet routers, routers are often subject to attack or malicious intent. Detecting these attacks before they cause damage is critical to maintaining network operation.

SUMMARY

In one example embodiment, provided is a blockchain computing system that includes one or more of a network interface that may receive requests transmitted from client devices, each request comprising a plurality of data attributes, a processor may detect a pattern from within the received requests, the detected pattern comprising a plurality of requests that share one or more data attributes in common, and storage may store the detected pattern as a hash-linked chain of blocks within a blockchain, wherein the hash-linked chain of blocks may include a sequence of blocks corresponding to a sequence of the plurality of requests included in the detected pattern, and, after the first block, each subsequent block in the hash-linked chain of blocks includes a hash of request data that is stored in a previous block.

In another example embodiment, provided is a computer-implemented method that includes one or more of receiving requests transmitted from client devices, where request may include a plurality of data attributes, detecting a pattern within the received requests, the detected pattern may include a plurality of requests that share one or more data attributes in common, and storing the detected pattern as a hash-linked chain of blocks within a blockchain, wherein the hash-linked chain of blocks may include a sequence of blocks corresponding to a sequence of the plurality of requests included in the detected pattern, and, after the first block, each subsequent block in the hash-linked chain of blocks includes a hash of request data that is stored in a previous block.

In another example embodiment, provided is a non-transitory computer readable medium having stored therein program instructions that when executed cause a computer to perform one or more of receiving requests transmitted from client devices, each request comprising a plurality of data attributes, detecting a pattern within the received requests, the detected pattern comprising a plurality of requests that share one or more data attributes in common, and storing the detected pattern as a hash-linked chain of blocks within a blockchain database, wherein the hash-linked chain of blocks may include a sequence of blocks corresponding to a sequence of the plurality of requests included in the detected pattern, and, after the first block, each subsequent block in the hash-linked chain of blocks includes a hash of request data that is stored in a previous block.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 2A is a diagram illustrating an architecture of a blockchain computing system in accordance with an example embodiment.

DETAILED DESCRIPTION

Figure 1:
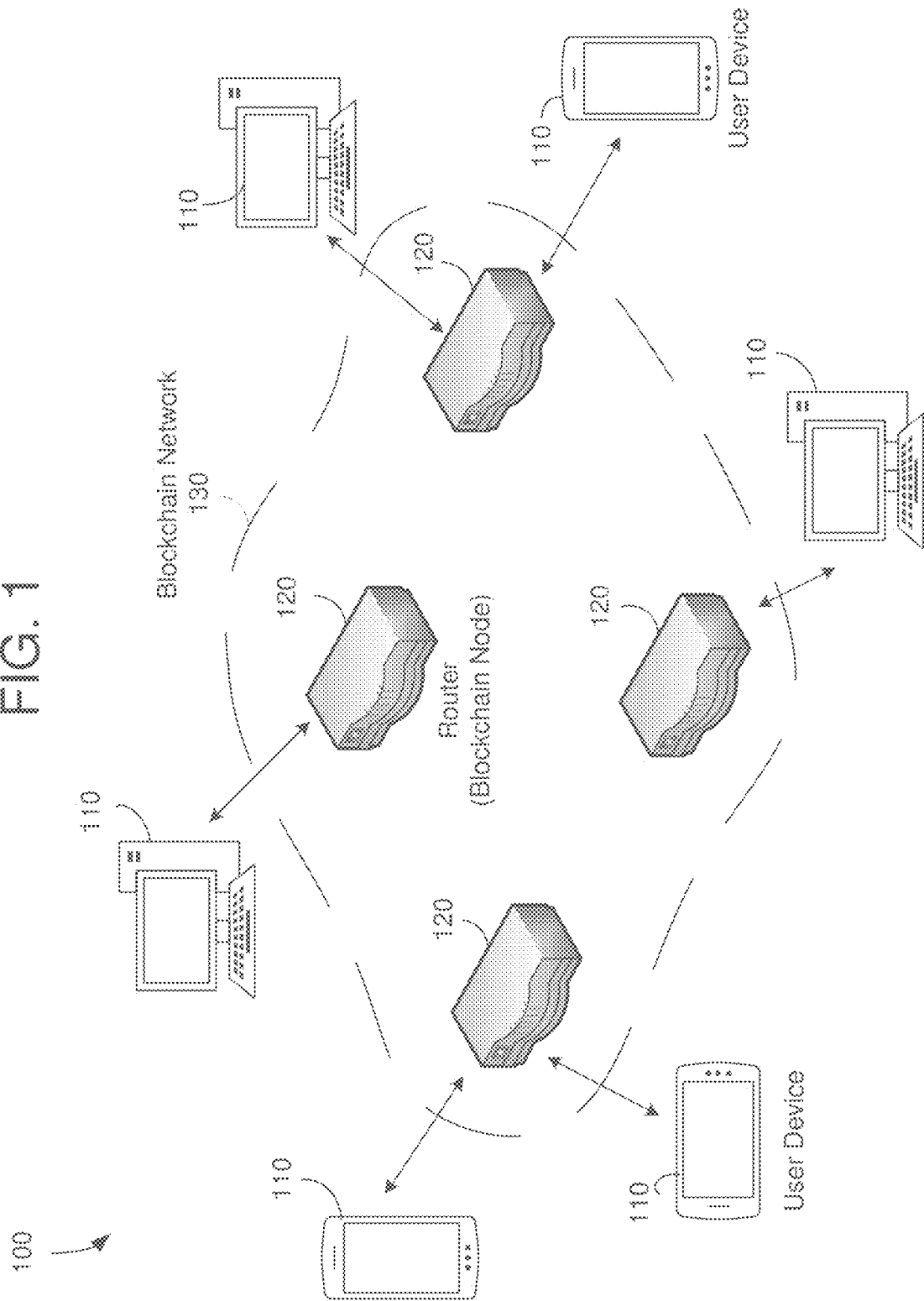
FIG. 1 is a diagram illustrating a blockchain computing network in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to a blockchain management system, and in another embodiment relates to a system that can recognize patterns within request/activity logs and store a chain of blocks representing the recognized pattern as a blockchain. Some of the examples herein refer to detecting patterns of network activity performed by a group of network routers that are part of a blockchain network of routers, however, the embodiments are not limited to network activity and may be used with any blockchain system in which data is logged or where patterns can emerge.

The example embodiments are directed to a blockchain technology that recognizes patterns. Every aspect of information that is encoded into a block within a blockchain is an opportunity for recognizing a pattern. For example, the patterns may be detected from logging internet activity on a router, but this is just one example. The pattern can be detected from any type of blockchain activity where patterns can emerge from the data. The pattern may be detected after the data has been stored on the blockchain or it may be detected as it is coming in (i.e., real-time). Traditional/related blockchain technologies do not provide the ability to identify patterns in real time and combine it with the integrity and security of a blockchain. A typical blockchain only connects the blocks chronologically while the example embodiments provide a blockchain that can make other connections that identify patterns.

The system described herein is used for identifying patterns in network activity as one example. Knowing that the use case is router logging, the system can be tailored to keep track of the many aspects about router logging that form patterns. For example, when a new block is added to the chain it is not only pointed to by the block that came before it, but it may also pointed to by the last block with the same source, destination, intent, or the like. Malicious agents may try to gain access to a network in many ways. Multiple attempts spread out over time can be detected by identifying blocks that have a common source and/or destination. Multiple attempts from different sources all at the same time can be identified with blocks containing the same destination within a short time interval. All the while, the router activity log is secure and trustworthy because it cannot be changed because the router activity log is stored as an immutable blockchain ledger.

Each router in the network may be a node with its own version of the blockchain. For security/integrity purposes, each version may be stored locally in a file but a database can be made to work with proper access management. One of the features in analyzing logs of any activity (internet requests as an example) is pattern recognition. Access and login requests are two examples that can create patterns in router activity logs. Essentially any event logged by a router can be enumerated into a block of information and stored on a blockchain as described herein. Multiple requests from the same source over a period of time can indicate something, while multiple requests from different sources at the same exact time can indicate something else. Each aspect of these activities (i.e. router activity) is another way for the technology to recognize, analyze, and perhaps act on patterns being formed. When a pattern emerges via the blockchain, a routing node (or a computer coupled thereto) may issue a warning or a request to a user device, an operator device, or the like.

Blockchain integrity is enforced by having many different copies that are decentralized across the network. While a malicious effort might compromise one block of one copy of the chain, it is very difficult to compromise all of them considering that each node is constantly independently active. Verifying a block on the chain is done by verifying that the other chains also contain that block as well as its connections to other blocks on the chain. Once a block of information is committed to the chain, all copies of the chain feature that block. This combats malicious efforts to retroactively change that information for whatever reason. Cryptographic hashing algorithms may be used to create a unique signature of that information based on the individual aspects of the block as well as its place on the chain (who points to it). If someone wanted to change a block, they would also have to change every block that comes after it. Because there are many copies of the chain, the one version of the chain they might create would not verify against all of the other copies and the constantly active independent nodes continuously updating the chain makes it incredibly difficult to compromise all of the copies at once. In this particular use case, once Internet activity is logged, no one can go back and delete/hide that activity.

FIG. 1 illustrates a blockchain computing network 100 in accordance with an example embodiment. Referring to FIG. 1, the blockchain computer network 100 includes a distributed group of blockchain nodes 120 which according to various embodiments may be network routers. The network routers 120 may communicate with one another and store a replica of a blockchain which is subject to consensus among the network routers 120. According to various embodiments, the blockchain may be used to execute and record an immutable log of network activity among the network routers 120 in the common network. Each activity recorded may include a unique blockchain ID, an identification of the parties involved, and the like. The blockchain computing network 100 also includes a network 130 connecting the routers 120 (e.g., a peer-to-peer network, etc.) via the Internet, a private network, and the like. Furthermore, user devices 110 (e.g., computers, tablets, mobile devices, POS terminals, and the like) may communicate with the routers 120 via a network such as the Internet, a private network, or the like, and provide transaction information to the blockchain.

When a network request is initiated by one of the user devices 110 via a network router 120, the network router 120 may execute the three phases of a blockchain transaction including the read phase, the validation phase, and the write phase, and commit the network activity to the shared blockchain. When the three execution phases are successful the transaction data is stored in the blockchain managed by the network router 120. Furthermore, each transaction that modifies the blockchain may be replicated across the other network 120 to ensure consensus among the blockchain nodes/network routers in the blockchain system 100.

As referred to herein, a blockchain network is a distributed system consisting of multiple nodes that communicate with each other. The blockchain runs programs called chaincode (e.g., smart contracts, etc.), holds state and ledger data, and executes transactions. Transactions are operations invoked on the chaincode. Transactions typically must be "endorsed" and only endorsed transactions may be committed and have an effect on the state of the blockchain system. There may exist one or more special chaincodes for management functions and parameters, collectively called system chaincodes.

Nodes are the communication entities of the blockchain system. A "node" is a logical function in the sense that multiple nodes of different types can run on the same physical server. Nodes may be grouped in trust domains and associated to logical entities that control them in various ways. Nodes may include different types such as a client or submitting-client node which submits a transaction-invocation to an endorser (e.g., peer), and broadcasts transaction-proposals to an ordering service (e.g., ordering node). Another type of node is a peer node which receives client submitted transactions, commits the transactions and maintains the state and a copy of the ledger. Peers can also have the role of an endorser, although it is not a requirement. The ordering-service-node or orderer is a node running the communication service for all nodes and which implements a delivery guarantee, such as atomic or total order broadcast to each of the peer nodes in the system when committing transactions and modifying the world state.

In the examples herein, the blockchain network may include a plurality of network routers which correspond to the blockchain nodes/peers. For example, each network router may manage a blockchain that is stored locally on the router or in a computing system or database connected thereto. The blockchain may be managed based on network requests received by all routers in the network. In these examples, the network may include a private network, an enterprise network, a public access network, or the like. Each time a network request is received by one of the blockchain routers, the network request may be stored as a block in the blockchain. The blockchain may be replicated and consensus may be performed among the network routers in the blockchain network to ensure the blockchain is the same across all network routers.

The ledger is a sequenced, tamper-resistant record of all state transitions of the blockchain. State transitions are a result of chaincode invocations (i.e., transactions, network requests, etc.) submitted by participating parties (e.g., client nodes, ordering nodes, endorser nodes, peer nodes, etc.) A transaction may result in a set of asset key-value pairs that are committed to the ledger as creates, updates, deletes, and the like. The ledger includes a blockchain (also referred to as a chain) which is used to store an immutable, sequenced record in blocks. For example, the immutable ledge may be an immutable ledger of network request activity, but the embodiments are not limited thereto. The ledger also includes a state database which maintains a current state of the blockchain. There is typically one ledger per channel. Each peer node maintains a copy of the ledger for each channel of which they are a member.

The chain is a transaction log which is structured as hash-linked blocks, and each block contains a sequence of N transactions where N is equal to or greater than one. The transactions in this case may include network requests/ activity. The block header may include a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added block represents every transaction on the chain that has come before it, making it possible to ensure that all peer nodes are in a consistent and trusted state. The chain may be stored on the peer node file system (either local or attached storage), efficiently supporting the append-only nature of the blockchain workload. In some examples, the chain may include a chronological ordering of transactions such as network requests. As another example, the chain may include a pattern of activity that is detected from within the requests.

The current state of the immutable ledger represents the latest values for all keys that are included in the chain transaction log. Because the current state represents the latest key values known to the channel, it is sometimes referred to as a world state. Chaincode invocations execute transactions against the current state data of the ledger. To make these chaincode interactions efficient, the latest values of the keys may be stored in the state database. The state database may be simply an indexed view into the chain's transaction log, it can therefore be regenerated from the chain at any time. The state database may automatically get recovered (or generated if needed) upon peer node startup, and before transactions are accepted.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). In some examples, the blockchain nodes may correspond to network routers. One or more of the blockchain nodes 281-284 may endorse transactions (e.g., network requests) and one or more blockchain nodes 281-281 may provide an ordering service for all blockchain nodes in the architecture 200A. A blockchain node may initiate a blockchain authentication and seek to write to a blockchain immutable ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. The can be deployed as a transaction and installed, via appending to the distributed ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, hashed identifier information 252 received from a client device may be processed by one or more processing entities (e.g., virtual machines) included in the blockchain layer 220. The result may include access being granted 254 to a third party application from the blockchain computing environment. In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols. In some embodiments, the blockchain ledger may correspond to an immutable log of network activity.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
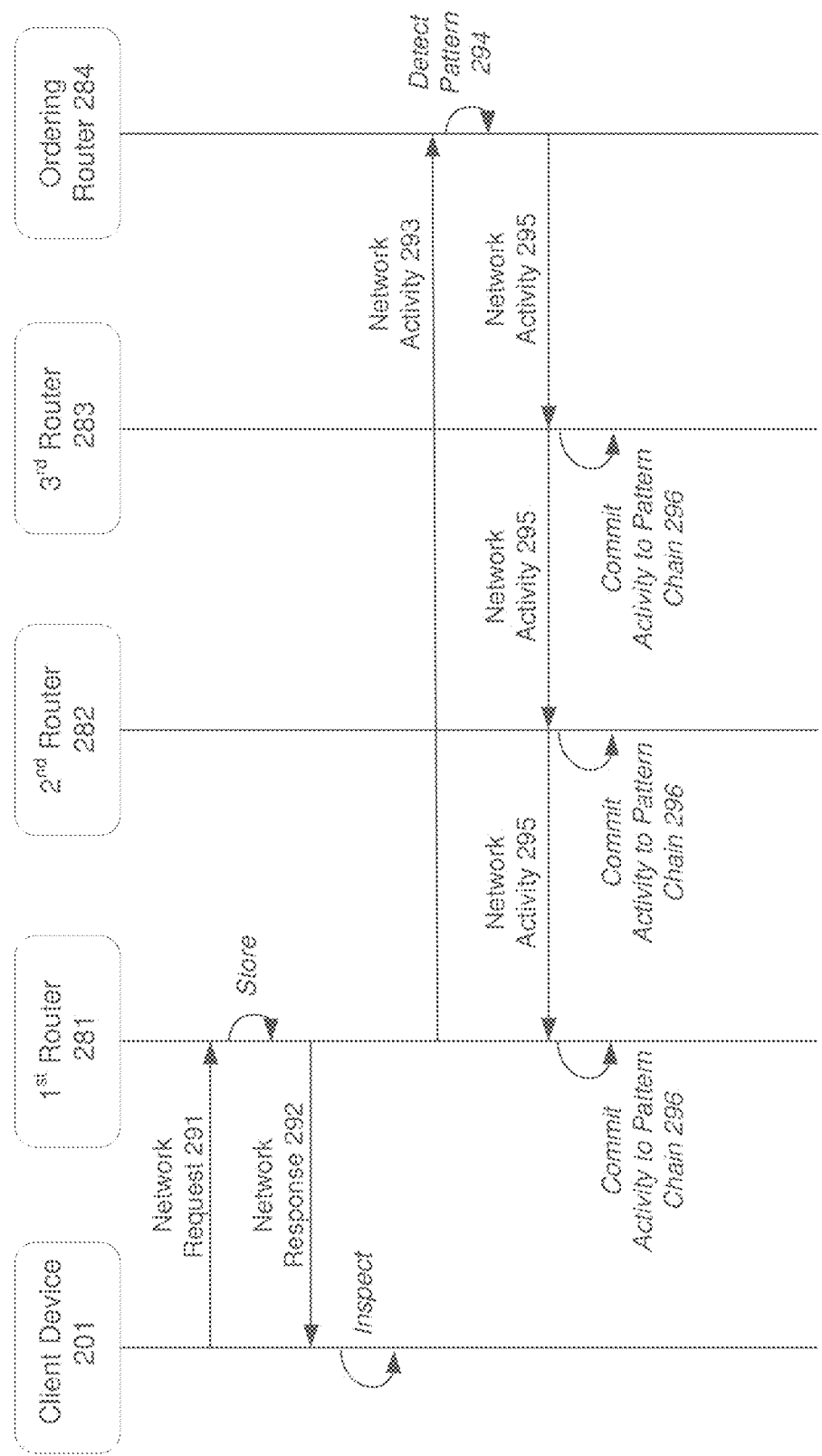
FIG. 2B is a diagram illustrating a communication sequence between blockchain nodes in accordance with an example embodiment.

FIG. 2B illustrates an example of a transactional flow 200B between blockchain nodes (i.e., network routers) of the blockchain in accordance with an example embodiment. Referring to FIG. 2B, the transaction flow may include a transaction proposal such as a network access request sent by an application client node 201 to an endorsing router node 281. The endorsing router node 281 may verify the client signature, and execute a chaincode function to simulate the transaction. The output is the chaincode results, a set of key/value versions that were read in the chaincode (read set), and the set of keys/values that were written in chaincode (write set). The proposal response gets sent back to the client 201 along with an endorsement signature. The client assembles the endorsements into a transaction payload and broadcasts it to an ordering service router node 284. The ordering service router node 284 then delivers ordered network requests as blocks to all peers 281-283 on a channel, or in this case, all network routers within a blockchain network of routers. Before committal, each network router 281-283 may validate the network transaction. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a network request to the router node 281 which is an endorser. The client 201 may include an application leveraging a supported software development kit (SDK) such as Node, Java, Python, and the like, which utilizes an available API to generate a transaction proposal. The request may invoke a chaincode function so that request data can be read and/or written to the ledger (i.e., write new key value pairs for the assets) in the form of blocks. The SDK may server as a shim to package the transaction proposal into a properly architected format (e.g., protocol buffer over gRPC) and take the client's cryptographic credentials to produce a unique signature for this network request proposal.

In response, the endorsing router node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing router node 281 may take the transaction proposal inputs as arguments to the invoked chaincode function. The chaincode is then executed against a current state database to produce transaction results including a response value, read set, and write set. However, no updates are made to the ledger at this point. In step 292, the set of these values, along with the endorsing router node's 281 signature may be transmitted as a network response to the client 201.

Furthermore, the endorsing router node 281 may submit the network activity to ordering service router 284, in 293, to update the immutable log of network activity (i.e., immutable ledger). For example, the immutable ledger of network activity may be a file stored at the router or a table in a database associated with the router. The network activity may contain the read/write sets of network activity data, the endorsing peers signatures and a channel ID. The ordering router node 284 does not need to inspect the entire content of a transaction in order to perform its operation; it may simply receive transactions from all channels in the network, order them chronologically by channel, and create blocks of transactions per channel. However, in another embodiment, in 294 the ordering router node 284 may detect a pattern from among network requests received by any of the routing nodes 281-283 and determine to generate a chain representing the detected pattern. There are many different processes that can be executed by the ordering router node 294 to provide pattern recognition/analysis between blocks as well as when new blocks are being added to the blockchain.

In step 294, the blocks of the pattern are delivered from the ordering router node 284 to all router nodes 281-283 on the channel. The network requests within the blocks are validated to ensure endorsement policy is fulfilled and to ensure that there have been no changes to ledger state for read set variables since the read set was generated by the transaction execution. The network request transactions in the block are tagged as being valid or invalid. Furthermore, in step 295 each peer node 281-283 appends the block to the detected pattern's chain, and for each valid transaction the write sets are committed 296 to current state database. An event is emitted, to notify the client application that the transaction (invocation) has been immutably appended to the detected pattern's chain, as well as notification of whether the transaction was validated or invalidated.

Figure 3:
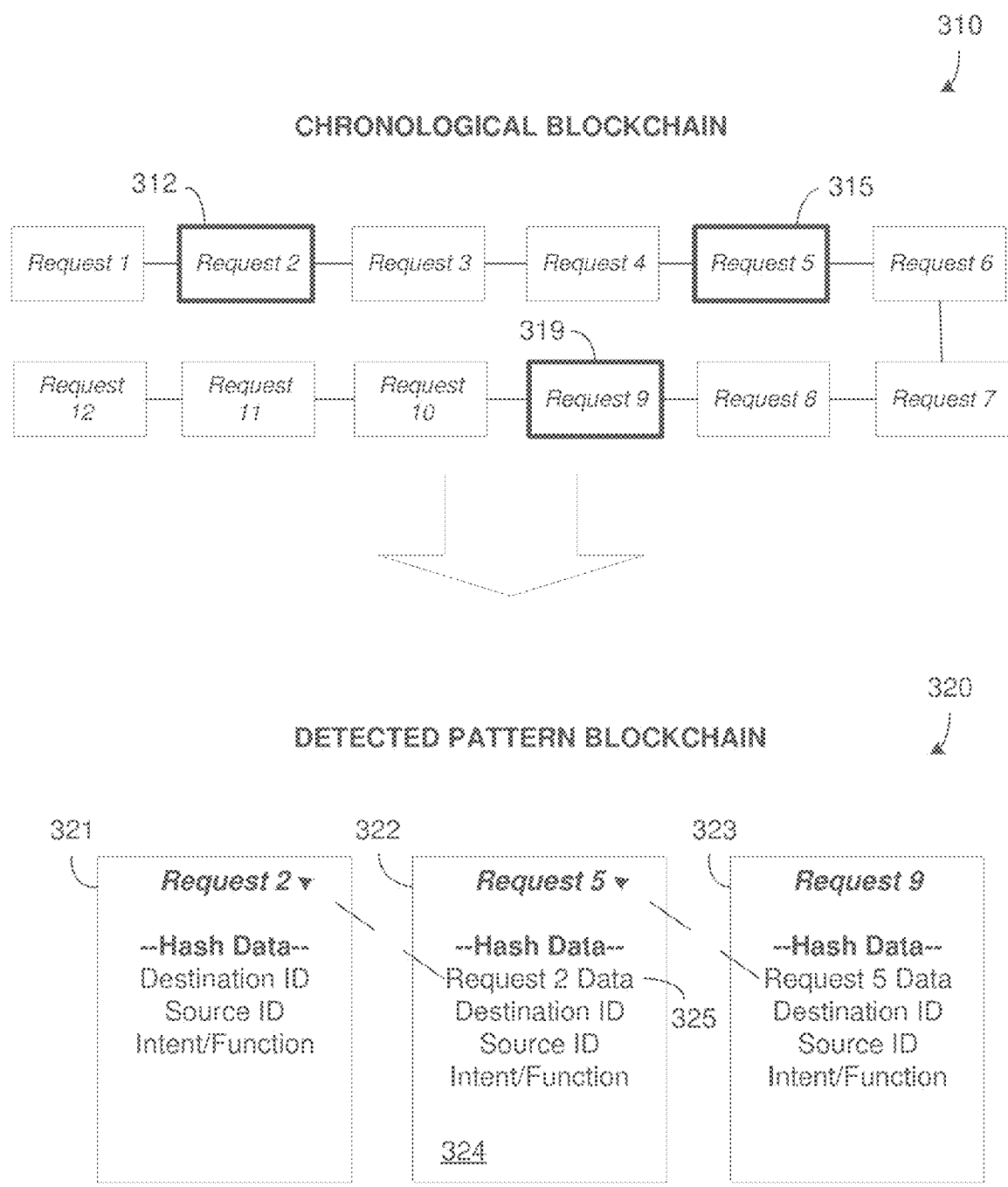
FIG. 3 is a diagram illustrating a pattern recognition performed by a blockchain system in accordance with an example embodiment.

FIG. 3 illustrates a pattern recognition performed by a blockchain network in accordance with an example embodiment. According to various aspects, the blockchain network can include multiple blockchain peers such as network routers, devices coupled to network routers, peer nodes, databases, and the like, which are connected to each other in a distributed network (e.g., peer-to-peer). The blockchain network can store requests as they are received in chronological order regardless of which peer receives the request. The blockchain may be replicated among all peers within the blockchain network. Each time a new request is received by one of the blockchain peers, the request can be added to the blockchain stored/replicated by other blockchain peers. In the example of FIG. 3, the blockchain peers correspond to network routers. When a network request is received by one of the network routers included in the blockchain system, the network request is stored in a blockchain that is managed by the network router, and that is replicated with other network routers within the blockchain network. As a non-limiting example, a plurality of routers of an enterprise network may make up a blockchain system of routers.

Referring to FIG. 3, a chronological order of network requests are stored as blocks in a blockchain 310 and replicated across all network routers in a blockchain network. Data from each network request may be stored as a block in the blockchain 310 in the order that it is received and may be linked to a previous block corresponding to a previously received network request. Each block may correspond to a network request such as a login request, a connection request, a data transmission request, an Internet request, and the like. As a result, a chain may be created that includes links between each block corresponding to each network request received by the network routers part of the blockchain network. The chain may be created by hashing data from the previous block (e.g., a block header) that corresponds to a previous network request received in chronological order. In blockchain 310, twelve network requests are linked together in a string or a chain of blocks with each subsequent block pointing to a previous block in chronological order.

According to various embodiments, the blockchain network described herein can store different blockchains in addition to or instead of the chronological blockchain 310. For example, the blockchain network herein may detect patterns within requests that are received by blockchain peers from client devices. In the example of the network router, the blockchain network may detect network patterns such as access patterns, transmission patterns, recipient patterns, sender patterns, and the like, which can indicate an intent such as an attack being perpetrated within the network of routers. The pattern that is detected may be stored as a blockchain 320. In this example, the patterns may be detected from the request data as it is coming into the blockchain network. As another example, the patterns may be detected from the blocks of data corresponding to previously received network requests. In either case, a blockchain peer router, ordering peer router, or the like, can detect patterns occurring within the blockchain network.

For example, requests 312, 315, and 319 may include data attributes in common that are detected and which indicate a pattern of network activity/behavior. For example, the requests 312, 315, and 319 may share one or more attributes 324 such as sender ID, receiver ID, intent, and the like. A network router (e.g., ordering node) or other computing system coupled thereto may detect the pattern from incoming data or from previously stored data stored on the blockchain. The node may generate a blockchain which includes data of the network requests that are part of the pattern linked together via a hash-linked chain of blocks 321, 322, and 323. In this example, each block in the hash-linked chain of blocks may point to a previous block via a hash 325 of data from the previous block. Accordingly, a network pattern may be stored as a blockchain within a blockchain database and replicated across all nodes in the blockchain network of routers. The network routers may then use this information when new requests are received to determine whether the new request is part of a previously detected pattern. If a network router detects that a newly received network request is part of a previously detected pattern, data of the request may be added to the blockchain 320 of the detected pattern.

Figure 4:
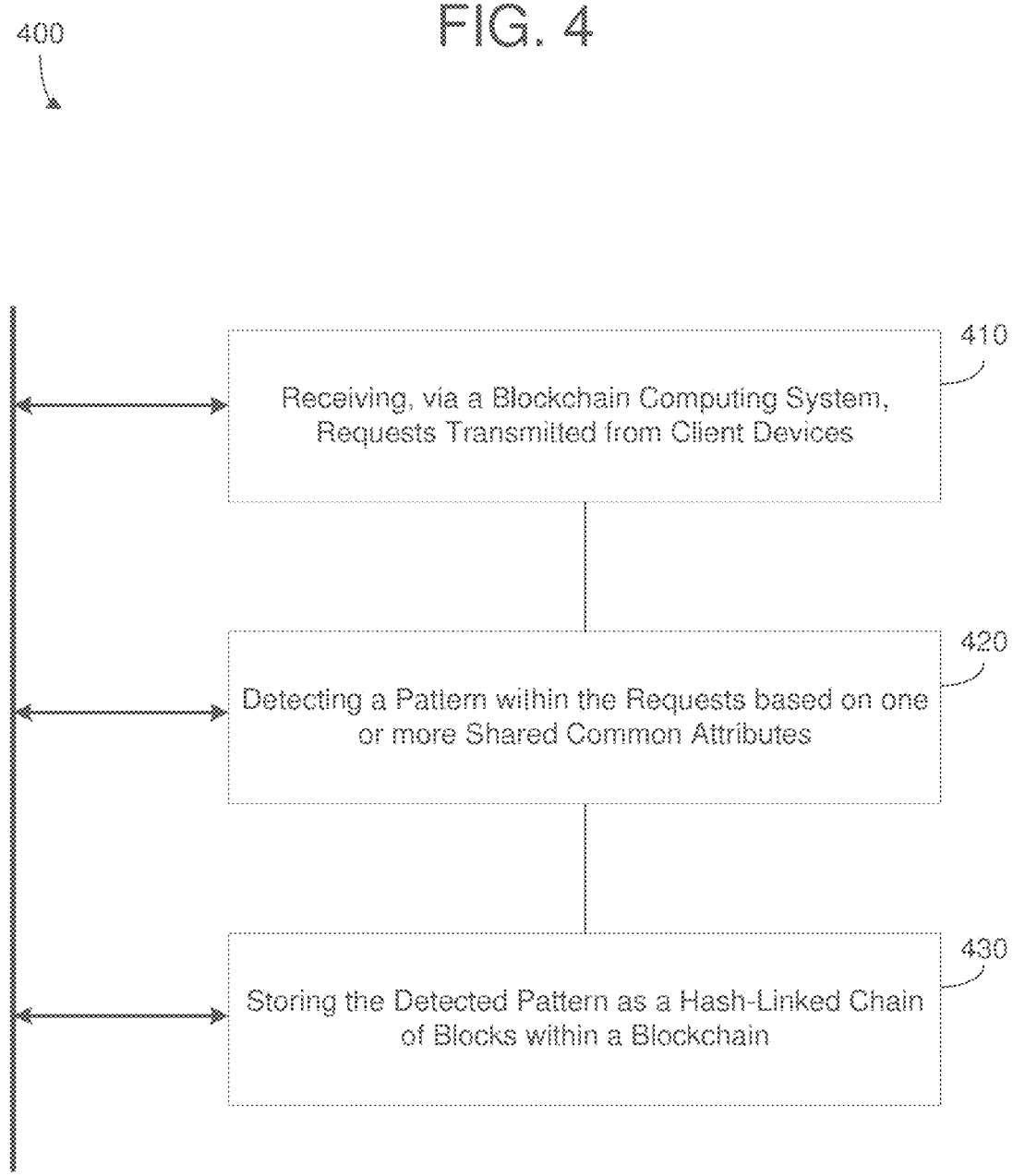
FIG. 4 is a diagram illustrating a method for recognizing and storing patterns in a blockchain in accordance with an example embodiment.

FIG. 4 illustrates a method 400 for recognizing and storing patterns in a blockchain in accordance with an example embodiment. For example, the method 400 may be performed by a network router, a blockchain node, and/or the like, which may include or be coupled to a computing device such as a database, a cloud platform, a computer, and the like. In 410, the method includes receiving requests transmitted from client devices. The requests may be received by a blockchain computing system such as a blockchain node, a network router, or the like, and each request may include a plurality of data attributes. For example, the request may include a network request such as a login request message, a network connection request (e.g., Internet access, etc.) and the like, which may be detected by the blockchain node from a network activity log maintained by the blockchain node. The data attributes within the request may include a type of the request, a sender of the request, a destination/recipient of the request, an intent or an action to be performed by the request, and the like. As another example, the request may include any other kind of blockchain transaction in which patterns may occur.

In 420, the method includes detecting a pattern within the received requests. The pattern may include a plurality of requests that are recognized because they share one or more data attributes in common. For example, the pattern may be detected by determining requests that have one or more attributes in common such as a common sender, a common destination, a common intent, and the like. The pattern may include a pattern of malicious behavior in the example of the network router, however the recognized pattern is not limited thereto. As another example, the pattern may include a spending pattern, a travel pattern, a pattern of consuming assets, and the like.

In 430, the method includes storing the detected pattern as a hash-linked chain of blocks within a blockchain. For example, the hash-linked chain of blocks may include a sequence of blocks corresponding to a sequence of the plurality of requests included in the detected pattern where each block represents one request made to the blockchain node (e.g., wireless router). The hash-link may include a has in each subsequent block in the chain of blocks based on a previous block. For example, each subsequent block in the chain may include a hash of data within the request such as a request header, an identification, a network address, or the like, which is stored in a previous block.

In some embodiments, the method 400 may further include storing a chain including a chronological sequence of network requests received by a blockchain network that includes the blockchain computing system. According to various embodiments, the sequence of network requests included in the detected pattern may include some network requests from the chronological sequence of network requests but not all of the chronological sequence of network requests received by the blockchain network. Furthermore, the network requests linked together via the detected pattern may not be in chronological order but may skip or miss network requests that are not determined to be part of the pattern of network activity. In other words, the system may identify network requests created at different times and/or at different locations which are involved in a common pattern. In some embodiments, the blockchain computing system performing the method 400 may be a network router included in a blockchain network that includes a plurality of other network routers which act as blockchain peers or nodes. Each network router may store a replication of the same blockchain data. In this case, the method may further include triggering replication of the stored hash-linked chain of blocks with the plurality of other network routers included in the blockchain network.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
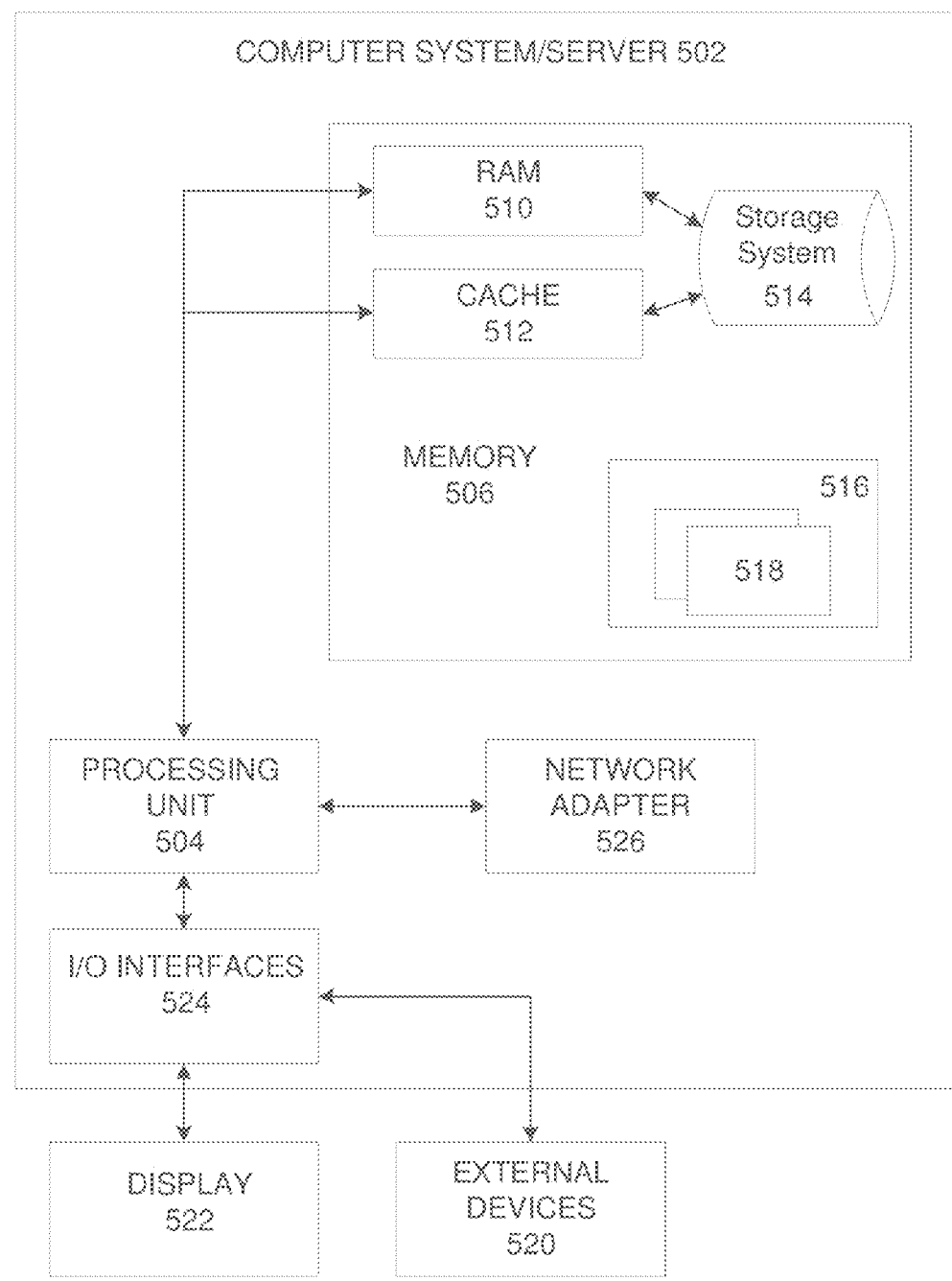
FIG. 5 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc. The computer system 500 may be a single device or a combination of devices. For example, the computer system 500 may be a blockchain node, a database, a server, a cloud platform, a network, a combination thereof, and the like.

FIG. 5 is not intended to suggest any limitation as to the scope of use or functionality of embodiments of the application described herein. Regardless, the computing system 500 (or node 500) is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include, but are not limited to, one or more processors or processing units 504 (i.e., processors), a system memory 506, and a bus that couples various system components including system memory 506 to processor 504. The computing node 500 may be a blockchain computing system such as a network router 120 shown in FIG. 1 or another device or combination of devices such as a server, cloud platform, database, and/or the like. Also, the computing node 500 may perform the method 400 shown in FIG. 4.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526 (also referred to as a network interface). As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Referring to FIG. 5, the network interface 526 may receive requests transmitted from client devices, and each request may include a plurality of data attributes. According to various embodiments, the processor 504 may detect a pattern from within the received requests. The detected pattern may include a plurality of requests that share one or more data attributes in common. The memory 506 may be configured to stores blockchains and may include a blockchain database such as a file, a table, or the like, or it may be a traditional database that is implemented within the computing node 500 or remotely associated with the computing node 500. The processor 504 may store the detected pattern in the memory 506 as a hash-linked chain of blocks within a blockchain. For example, the hash-linked chain of blocks may include a sequence of blocks corresponding to a sequence of the plurality of requests included in the detected pattern. Within the chain, after the first block, each subsequent block in the hash-linked chain of blocks includes a hash of request data that is stored in a previous block.

In some embodiments, the requests may include network request received by a network router such as login requests, network access/connection requests, data transmission requests, and the like. The requests may be stored within a network activity log that is implemented within the memory 506. When detecting a pattern among the network requests, the network router may identify requests that have one or more attributes in common as being part of a same pattern of network behavior. For example, network requests that share one or more of a common sender, a common destination, a common intent, or the like, can be identified as being part of the same pattern of behavior (e.g., malicious intent) even though the requests are separated by other requests, not in chronological order, received by different network routers, and the like. Because the blockchain may be replicated with other routers that also store a distributed replica of the blockchain, the pattern may be detected from across different or multiple routers.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A blockchain computing system comprising:
a network interface configured to receive a chronological sequence of requests transmitted from client devices, each request comprising a plurality of data attributes;
a processor configured to detect a pattern from within the received requests, the detected pattern comprising a plurality of non-sequential requests that share one or more data attributes in common; and
a storage configured to store the plurality of non-sequential requests of the detected pattern as a plurality of blocks, respectively,
wherein the processor hash links together the plurality of non-sequential requests of the detected pattern as a sequential chain of blocks within a blockchain, respectively, wherein the processor generates and stores a hash of request content from a first sequential request of a first block within a second block storing content of a second non-sequential request.

2. The blockchain computing system of claim 1, wherein the requests comprise network activity log requests including one or more of login requests, network connection requests, and transmission requests.

3. The blockchain computing system of claim 2, wherein the one or more shared data attributes in the network requests used by the processor to detect the pattern include one or more of a common sender, a common destination, and a common intent.

4. The blockchain computing system of claim 1, wherein the processor is further configured to store the chronological sequence of network requests received as a second sequential chain of hash-linked blocks.

5. The blockchain computing system of claim 1, wherein the non-sequential requests included in the detected pattern include some network requests from the chronological sequence of network requests but not all of the chronological sequence of network requests.

6. The blockchain computing system of claim 1, wherein the processor is configured to detect a pattern of malicious network activity.

7. The blockchain computing system of claim 1, wherein the blockchain computing system comprises a network router included in a blockchain network that includes a plurality of other network routers.

8. The blockchain computing system of claim 7, wherein the processor is further configured to trigger replication of the stored hash-linked chain of blocks with the plurality of other network routers included in the blockchain network.

9. A computer-implemented method comprising:
receiving, via a blockchain computing system, a chronological sequence of requests transmitted from client devices, each request comprising a plurality of data attributes;
detecting a pattern within the received requests, the detected pattern comprising a plurality of non-sequential requests that share one or more data attributes in common; and
storing the plurality of non-sequential requests of the detected pattern as a plurality of blocks, respectively,
wherein the blockchain computing system hash-links together the plurality of non-sequential requests of the detected pattern as a sequential chain of blocks within a blockchain respectively, wherein the processor generates and stores a hash of request content from a first sequential request of a first block within a second block storing content of a second non-sequential request.

10. The computer-implemented method of claim 9, wherein the requests comprise network activity log requests including one or more of login requests, network connection requests, and transmission requests.

11. The computer-implemented method of claim 10, wherein the one or more shared data attributes in the network requests used to detect the pattern include one or more of a common sender, a common destination, and a common intent.

12. The computer-implemented method of claim 9, further comprising storing the chronological sequence of network requests received as a second sequential chain of hash-linked blocks.

13. The computer-implemented method of claim 9, wherein the non-sequential requests included in the detected pattern include some network requests from the chronological sequence of network requests but not all of the chronological sequence of network requests.

14. The computer-implemented method of claim 9, wherein the detected pattern comprises a detected pattern of malicious network activity.

15. The computer-implemented method of claim 9, wherein the blockchain computing system comprises a network router included in a blockchain network that includes a plurality of other network routers.

16. The computer-implemented method of claim 15, further comprising triggering replication of the stored hash-linked chain of blocks with the plurality of other network routers included in the blockchain network.

17. A non-transitory computer readable medium having stored therein program instructions that when executed cause a computer to perform a method comprising:
- receiving, via a blockchain computing system, a chronological sequence of requests transmitted from client devices, each request comprising a plurality of data attributes;
- detecting a pattern within the received requests, the detected pattern comprising a plurality of non-sequential requests that share one or more data attributes in common; and
- storing the plurality of non-sequential requests of the detected pattern as a sequential chain of hash-linked blocks within a blockchain, wherein the blockchain computing system hash-links together the plurality of non-sequential requests of the detected pattern as a sequential chain of blocks within a blockchain, respectively, wherein the processor generates and stores a hash of request content from a first sequential request of a first block within a second block storing content of a second non-sequential request.

18. The non-transitory computer readable medium of claim 17, wherein the requests comprise network activity log requests including one or more of login requests, network connection requests, and transmission requests.

19. The non-transitory computer readable medium of claim 18, wherein the one or more shared data attributes in the network requests used to detect the pattern include one or more of a common sender, a common destination, and a common intent.

20. The non-transitory computer readable medium of claim 17, wherein the detected pattern comprises a detected pattern of malicious network activity.

* * * * *